United States Patent [19]
Lee et al.

[11] Patent Number: 5,625,538
[45] Date of Patent: Apr. 29, 1997

[54] HIGH POWER FACTOR POWER-SUPPLY SYSTEM

[75] Inventors: Youngsik Lee, Anyang; Kyungha Jee, Bucheon, both of Rep. of Korea

[73] Assignee: Samsung Electronics Co., Ltd., Suwon, Rep. of Korea

[21] Appl. No.: 227,353

[22] Filed: Apr. 13, 1994

[30] Foreign Application Priority Data

Apr. 13, 1993 [KR] Rep. of Korea .................. 93-6147

[51] Int. Cl.$^6$ ............................................. H02M 5/458
[52] U.S. Cl. ................................. 363/15; 363/37; 363/98
[58] Field of Search ............................ 363/17, 21, 37, 363/89, 98, 124; 323/222

[56] References Cited

U.S. PATENT DOCUMENTS

| | | | |
|---|---|---|---|
| 4,677,366 | 6/1987 | Wilkinson et al. | 323/222 |
| 5,003,454 | 3/1991 | Bruning | 363/81 |
| 5,063,490 | 11/1991 | Maehara | 363/37 |
| 5,315,496 | 5/1994 | Okochi | 363/21 |
| 5,371,667 | 12/1994 | Nakao | 363/124 |

*Primary Examiner*—Peter S. Wong
*Assistant Examiner*—Rajnikant B. Patel
*Attorney, Agent, or Firm*—Cushman Darby & Cushman, IP Group of Pillsbury Madison & Sutro LLP

[57] ABSTRACT

The present invention relates to a high power factor power supply system of high efficiency which is small in size and light in weight. The invention operates by setting the input power factor to 1 and by controlling a resonant converter. The power factor power supply system according to this invention includes: a full wave rectifying means for rectifying an alternating signal; a voltage dividing means for dividing a rectified signal; a capacitor connected in parallel to the voltage dividing means; an inductor connected to the full wave rectifying means; switching means for controlling a supply of current flowing in the inductor; a resonant circuit portion formed of the inductor and capacitor and connected to the switching means; an output circuit for receiving a signal of the resonant circuit portion, rectifying and then transmitting the signal to a load; and a controlling circuit for providing a switching controlling signal to the switching means. The controlling circuit includes a saw tooth wave signal generator, comparing means for comparing an output of the voltage dividing means with a signal of the saw tooth wave signal generator, and a frequency divider for generating a switching controlling signal having a zero area at each switching pulse according to an output of the comparing means.

22 Claims, 12 Drawing Sheets

S1 Gate voltage

S2 Gate voltage

S2 VDS voltage

HIGH POWER FACTOR POWER-SUPPLY SYSTEM

BACKGROUND OF THE INVENTION (1) Field of the Invention

The present invention relates to a high power factor power-supply system. More particularly, it relates to a resonant converter which achieves stable output control and improves input power factor over large fluctuations in input voltages and loads.

(2) Description of the Prior Art

Generally, a converter that changes an alternating current power source into a direct current power source is used to supply power at a predetermined level to a load. As shown in FIG. 1a, an alternating current power source Vs is rectified by a full-wave rectifier circuit, a smoothing capacitor (C) connected to the full-wave rectifier circuit, and a DC—DC converter (DC to DC converter), to supply direct current power to load $R_L$. As shown in FIG. 1B, the phase relationship of input current i and voltage $V_s$ is modified by the circuit shown in FIG. 1A. The modification results from the influence of the capacitor C that deteriorates the power factor. The equation for power factor is as follows, wherein voltage and current should be equal to each other and in phase:

$$\cos\phi = \frac{w}{V \cdot A} \quad (1)$$

wherein W is a consuming power, and V and A are virtual values of the voltage and current at the alternating current input's side.

FIG. 2A shows a power supply system circuit improving power factor, which has been made by the present inventor. As shown in FIG. 2B, the power factor is improved to a large degree.

The circuit improving power factor is similar to the circuit shown in FIG. 1A. In this circuit a switching device Q is turned on or off at suitable times, so that inductor L transmits a rectified wave form.

A control circuit turning on or off switching device Q uses comparator WC to compare a rectified signal derived from input power Vs with a rectified signal obtained after the input power (Vs) passes through a transformer T1. The resultant value is amplified by a current amplifier IE to generate a switching control signal.

In the circuit of FIG. 2A, current increases to a predetermined current maximum when blocking diode D is turned off, and current decreases to a current minimum when switching device Q is turned off and blocking diode D is turned on. The input current i is limited to having a predetermined width, and the virtual value of the current is controlled to improve power factor.

The circuit of FIG. 2A uses the principle of a boosting type converter. Such systems are inherently complicated, and the transformed current is large. The weight of such systems are heavy and the reliability is decreased because of poor switching characteristics. As shown in FIG. 2B, the conventional circuit has the further disadvantages that there are a dead angle of current and a dead time of current.

SUMMARY OF THE INVENTION

The present invention is made in an effort to solve the problems of conventional systems.

It is an object of the present invention to provide a high power factor power supply system having high efficiency, being small in size, and being light in weight. The objective is accomplished by setting the input power factor to 1 and by controlling a resonant converter to simultaneously control the frequency of the alternating current power source.

As shown in FIG. 3, the invention is formed between alternating current power source 1 and load $R_o$ which requires direct current power. FIG. 3 shows the present invention in block form. The detailed circuits shown in the drawings are the preferred embodiment, and the invention includes various modifications of these circuits.

To achieve the above object, a high power factor power supply system comprises:

a full wave rectifying means for rectifying an alternating signal;

a voltage dividing means for dividing a rectified signal;

a capacitor connected in parallel to the voltage dividing means;

an inductor connected to the full wave rectifying means;

switching means for controlling current flowing in the inductor;

a resonant circuit portion formed of the inductor and capacitor and connected to the switching means;

an output circuit for receiving a signal of the resonant circuit portion, rectifying and then transmitting the signal to a load; and a controlling circuit for providing a switching controlling signal to the switching means;

the controlling circuit including a saw tooth wave signal generator, comparing means for comparing an output of the voltage dividing means with a signal of the saw tooth wave signal generator, and a frequency divider for generating a switching controlling signal having a zero area at each switching pulse according to an output of the comparing means.

As another aspect of this invention, a high power factor power supply system comprises:

a full wave rectifying means for rectifying an alternating signal;

a voltage dividing means for dividing a rectified signal;

a capacitor connected in parallel to the voltage dividing means;

an inductor connected to the full wave rectifying means;

switching means for controlling current flowing in the inductor;

a resonant circuit portion formed of the inductor and capacitor and connected to the switching means;

an output circuit for receiving a signal of the resonant circuit portion, rectifying and then transmitting the signal to a load;

a frequency divider for providing a switching controlling signal to the switching means;

a comparing means for feedbacking from a dividing circuit a signal supplied to the load and then comparing the signal; and an error amplifying means receiving an output of the comparing means to increase and decrease frequency of the saw tooth wave generator according to a signal level of the error amplifying means.

As a third aspect of this invention, a high power factor power supply system of this invention comprises:

a full wave rectifying means for rectifying an alternating signal;

a voltage dividing means for dividing a rectified signal;

a capacitor connected in parallel to the voltage dividing means;

an inductor connected to the full wave rectifying means;

switching means for controlling current flowing in the inductor;

a resonant circuit portion formed of the inductor and capacitor and connected to the switching means;

a transformer for receiving a signal of the resonant circuit portion, rectifying and then transmitting the signal to a load;

a frequency divider for providing a switching controlling signal to the switching means;

a comparing means for feedbacking from a dividing circuit a signal supplied to the load and then comparing the signal; and an error amplifying means receiving an output of the comparing means to increase and decrease frequency of the saw tooth wave generator according to a signal level of the error amplifying means.

DETAILED DESCRIPTION OF THE PREFERRED EMBODIMENTS

Preferred embodiments of the present invention will now be described in detail with reference to the accompanying drawings.

Figure 3:
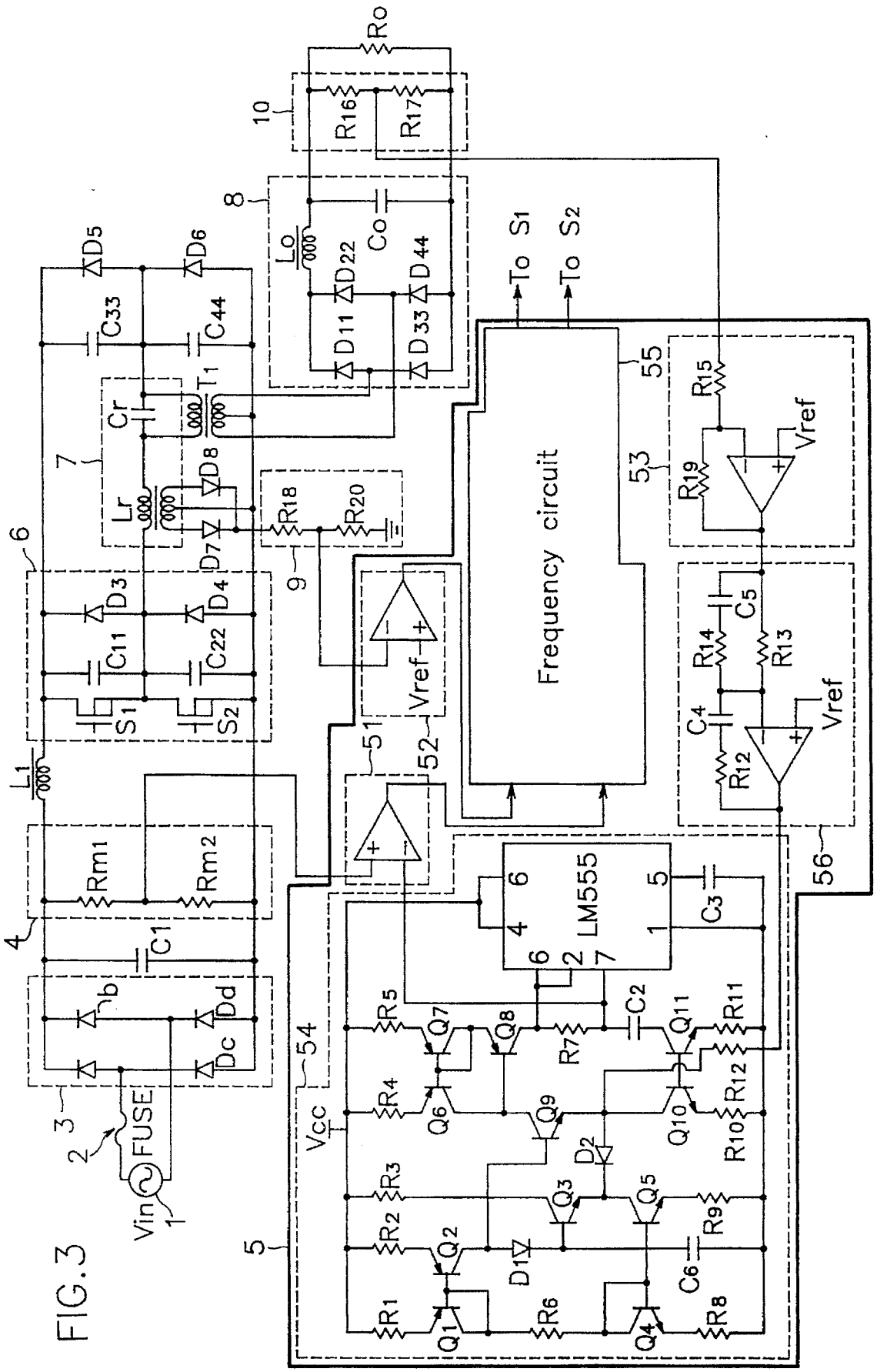
FIG. 3 is a circuit diagram of a power supply system in accordance with the present invention.

FIG. 3 is a detailed circuit diagram of a first preferred embodiment of the present invention. As shown in FIG. 3, alternating current input power source 1 is full-wave rectified by full-wave rectifying portion 3 formed of diodes $D_a$ to $D_d$. Fuse 2 is used for protecting the circuit. The voltage rectified by full-wave rectifying portion 3 is detected by full-wave rectifying signal detecting portion 4 connected to capacitor C, in parallel, and processed by controller 5.

After alternating current input power $V_{in}$ is full-wave rectified by diodes $D_a$ to $D_d$ of full-wave rectifying portion 3, a little offset voltage is produced by capacitor $C_1$. The voltage is divided by resistances $Rm_1$, $Rm_2$ and applied to a positive (+) input terminal as the reference voltage of the first comparator 51. Therefore, when the alternating current input power $V_{in}$ is a power source of 60 Hz, the reference voltage will not be zero every 120 Hz.

If the capacitor $C_1$ is not provided, then an output is not produced from the first comparator 51 at each 120 Hz, and the whole system may operate unstably. Accordingly, capacitor $C_1$ has been provided to preclude unstable operation.

Figure 6A:
FIGS. 6A to 6G are wave form charts of each part of FIG. 5.
Figure 6B:
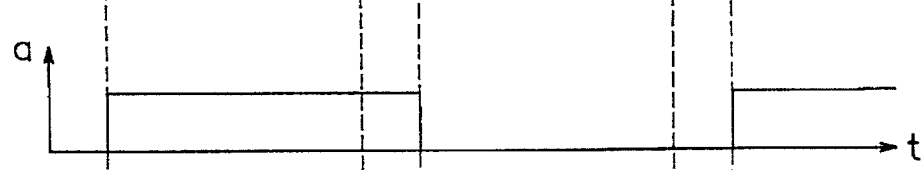
Figure 6C:
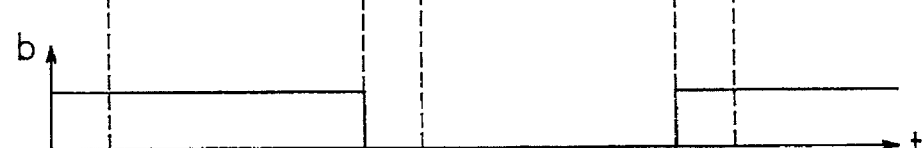
Figure 6D:
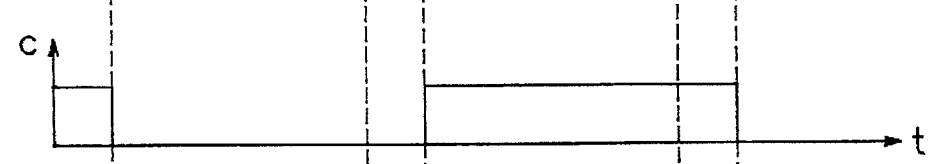
Figure 6E:
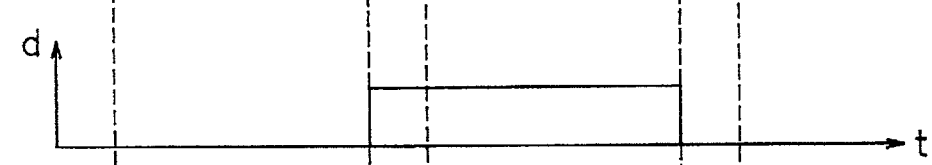
Figure 6F:
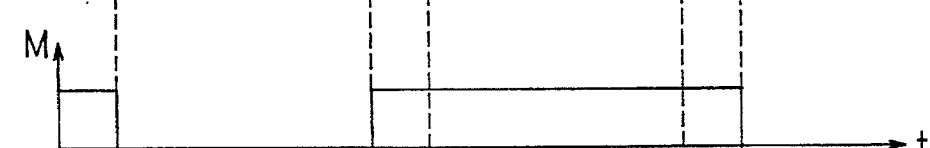
Figure 6G:
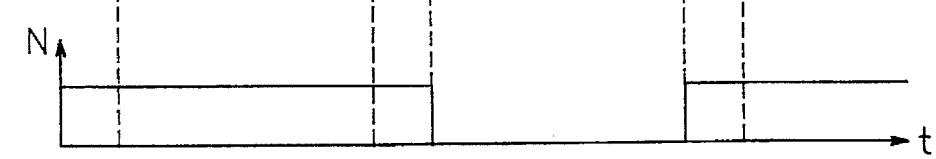

Controller 5 outputs wave forms, as shown in FIGS. 6F and 6G, to switching driving circuit 551 (shown in FIG. 7) to apply the wave forms to high frequency switching portion 6.

Figure 4A:
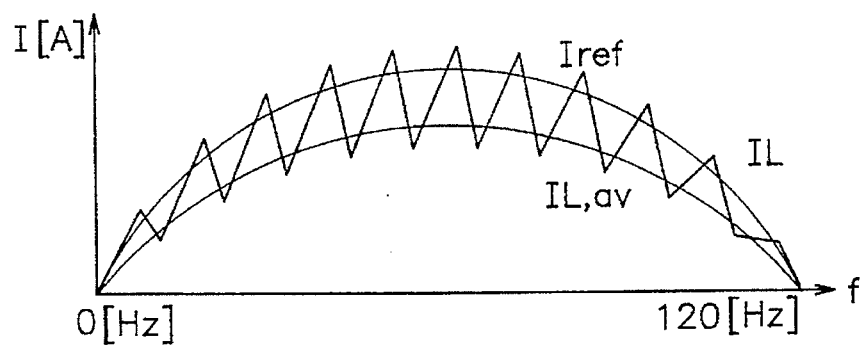
FIGS. 4A to 4D are wave form charts of each part of FIG. 3.

Coil $L_1$ is connected between full-wave rectifying signal detecting portion 4 and high frequency switching portion 6. Current flows in coil $L_1$ as shown in FIG. 4A according to the switching condition of high frequency switching portion 6. More particularly, if switching devices $S_1$, $S_2$ of high frequency switching portion 6 perform a switching action according to a signal from controller 5, the current wave form in coil $L_1$ is as shown in FIG. 4A.

If the switching device $S_1$ or $S_2$ is turned on, the current flowing in coil $L_1$ increases linearly, and then begins to decrease when switching devices $S_1$, $S_2$ are turned off.

The controller 5 operates to turn on switching devices $S_1$, $S_2$ before the current flowing in coil $L_1$ becomes zero and the current flowing in coil $L_1$ increases again. The current wave-form flowing in coil $L_1$ is thus shown in FIG. 4A and results from this switching technique. Accordingly, the input voltage and input current are in phase, and the power factor is 1.

Controller 5 that supports the above described operation uses an output signal from full-wave rectifying signal detecting portion 4 and two other detected signals as well. One of the other detected signals is derived from resonant circuit portion 7 which includes resonant inductor $L_r$ and resonant capacitor $C_r$ connected to each other in series. The other detected signal is fed back from voltage divider 10 and represents part of the voltage applied to load $R_o$.

More particularly, controller 5 receives three signals. The first signal is received from resonant inductor $L_r$ via voltage divider 9 formed of resistors $R_{18}$, $R_{20}$. The second signal is derived from the voltage supplied to load $R_o$ so as to take into consideration any fluctuations in the power provided to load $R_o$ and is fed back to controller 5. The third signal is input from full-wave rectifying signal detecting portion 4. Controller 5 generates a final switching control signal in response to the three input signals and outputs it to high frequency switching portion 6.

Signals input to controller 5 from full-wave rectifying signal detecting portion 4 and voltage divider 9 are respectively applied to first and second comparators 51, 52, and the feedback signal from load $R_o$ is applied to phase inverter 53. The other signal applied to first comparator 51 is an output from voltage control oscillator (VCO) 54. The other signal applied to second comparator 52 is a predetermined reference voltage $V_{ref}$. Output signals from first and second comparators 51, 52 are applied to frequency divider 55 formed of logic gate means, and frequency divider 55 generates the switching control signal that is transmitted to high frequency switching portion 6.

VCO 54 receives an output from error amplifier 56 which amplifies an error signal derived from phase inverter 53 and reference voltage $V_{ref}$. A detailed description of the error signal derivation follows below. VCO 54 comprises a circuit for generating a saw tooth wave form that drives switching devices $S_1$, $S_2$ of high frequency switching portion 6 and a circuit for soft-starting. The soft start relates to when the operation starts and causes the switching frequency to be several times as large as the switching frequency during subsequent normal operation. Since the power initially transmitted to load $R_o$ is too little, if the switching frequency is several times as large as a natural resonant frequency $W_o$, then unstable operation of the system at startup can be prevented. This is especially true if a discharge lamp, such as a fluorescent lamp, is the load. The soft start technique can lengthen the durability of a fluorescent lamp. In VCO 54, diode D2 is inserted between the circuit for soft-starting and the circuit for generating the saw tooth wave form.

The following description pertains to the operation of the soft start circuit. If controller 5 starts to work, current from the constant current source formed by transistors $Q_1$, $Q_2$ charges capacitor $C_6$ via diode $D_1$. Accordingly, the voltage of capacitor $C_6$ rises regularly. The increase in the voltage of capacitor $C_6$ continues until the turn-on state of diode D2 stops. Transistor $Q_9$ is first turned on by the increase in the voltage of capacitor $C_6$, and if transistor $Q_3$ is turned on after the threshold voltage (about 0.7 V) of diode D, drops, the potential difference across diode $D_2$ is zero which stops the turn-on state of diode $D_2$.

In the soft-start circuit, the capacitance of capacitor $C_6$ which determines the soft-start time is expressed by the following equation:

$$C_6 = \frac{I_C \times T_{st}}{V_{th}} \quad (2)$$

wherein $V_{th}$: reference voltage of internal comparator LM555, $I_c$: current [µA] flowing to $C_6$ $T_{st}$: soft-start time [µs]

The following description relates to the circuit that generates the saw tooth wave form.

If constant current flows in capacitor $C_2$ from the current source formed by transistors $Q_6$, $Q_7$, the voltage of capacitor $C_2$ rises regularly. If the voltage of capacitor $C_2$ amounts to the reference voltage of internal comparator LM 555, the capacitor $C_2$ is rapidly charged.

Figure 4B:
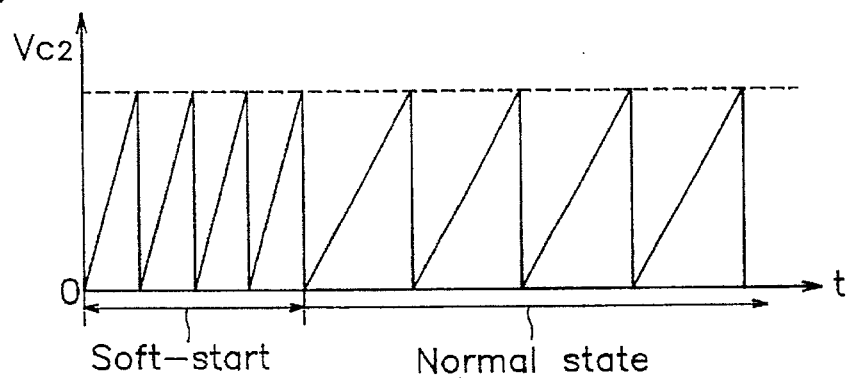

If capacitor $C_2$ is discharged, the current that flows from transistors $Q_6$, $Q_7$, charges capacitor $C_2$. And if the voltage of capacitor $C_2$ equals the reference voltage of internal comparator LM 555, the voltage is discharged to generate a saw tooth wave form. FIG. 4B illustrates a voltage wave form of capacitor $C_2$. The voltage wave form of capacitor $C_2$ is applied to a negative (−) input terminal of first comparator 51.

In this case, the capacitor C2 determining the saw tooth frequency is given by the following equation.

$$C_2 = \frac{I_c}{V_{th} \times f_s} \quad (3)$$

Ic : Current flowing to the capacitor $C_2$ [µA]

$V_{th}$: reference voltage of comparator [V]

$f_s$: saw tooth wave frequency [kHz]

Figure 4C:
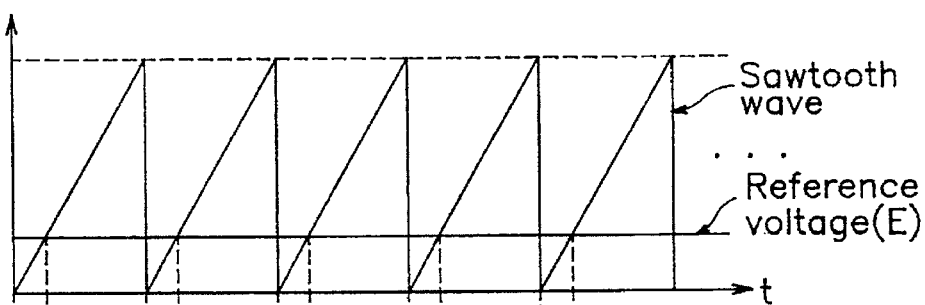
Figure 4D:
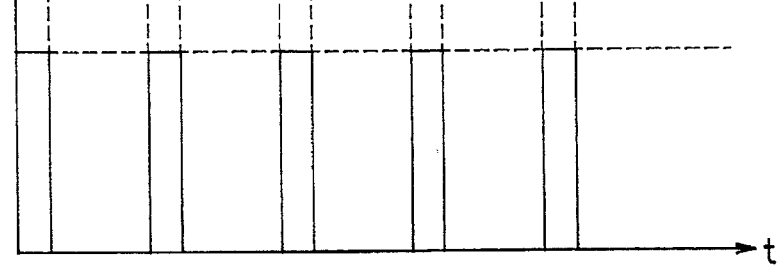

The alternating current input power is an alternating current of 60 [Hz] and 110 V or 220 V, and current and voltage is equal to each other in phase, and power factor is 1. This signal is full-wave rectified by full-wave rectifying circuit 3, and a signal detected by resistances $R_{m1}$, $R_{m2}$ full-wave rectifying signal detecting portion 4 is supplied to controller 5. This detected signal is applied to a positive (+) input terminal of an operational amplifier of first comparator 51, and is compared with the output from VCO 54, as shown in FIG. 4C. The first comparator 51 outputs the comparison result as a signal of low level or high level that may be used in a logic circuit, as shown in FIG. 4D.

In relation to the voltage drop of capacitor $C_1$ of FIG. 3, this voltage is a voltage that is full-wave rectified and has a ripple of 120 Hz, provided the alternating current input power Vin is 60 Hz. If switching devices S1, S2 of high frequency switching portion 6 are driven by several kHz, the voltage drop of capacitor C1 may be taken as almost a direct current voltage in a period at each time of switching.

The direct current voltage is indicated by "E" in FIG. 4C, and is applied to a positive (+) input terminal of first comparator 51 of controller 5 to be used as reference voltage. The saw tooth wave form of VCO 54 is input to the negative (−) input terminal of first comparator 51 and after comparison of the input signals a pulse wave form is produced as shown in FIG. 4D.

Figure 5:
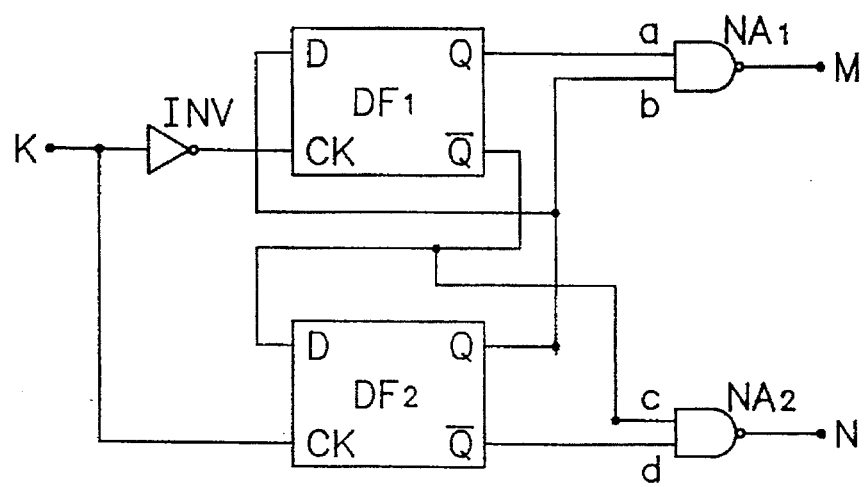
FIG. 5 is a gate circuit diagram of a frequency divider portion of FIG. 3.
Figure 7:
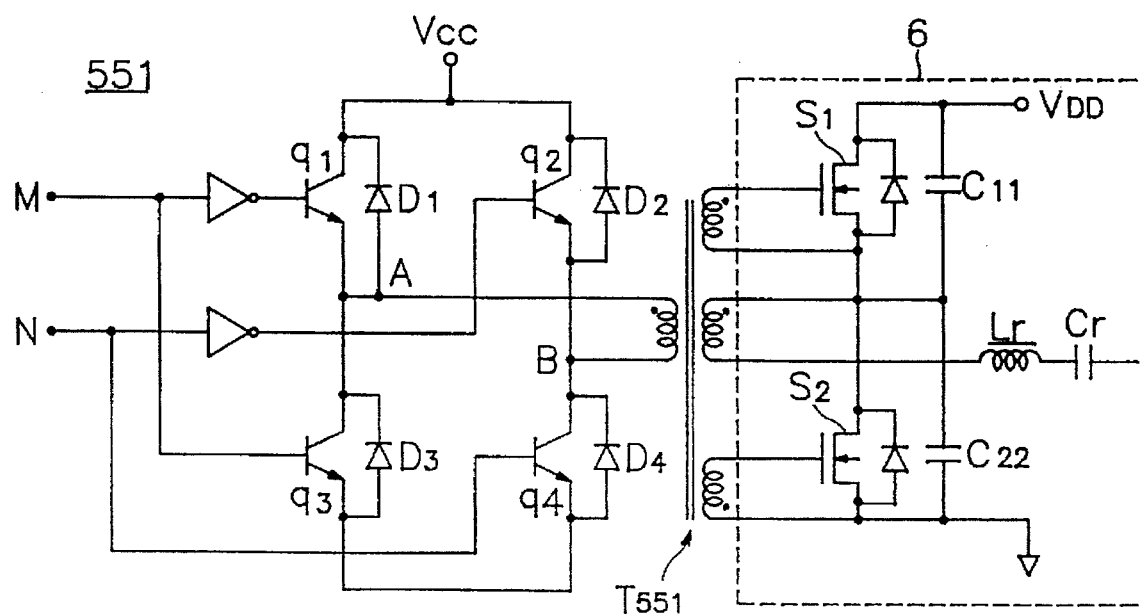
FIG. 7 is a gate driving circuit diagram of the frequency divider portion of FIG. 3.

Frequency divider 55 of controller 5 includes D type flip-flops $DF_1$, $DF_2$, connected to each other in series, and NAND gates $NA_1$, $NA_2$ all shown in FIG. 5, and switching device driving circuit 551 shown in FIG. 7.

Clock signal K applied to D type flip-flops $DF_1$, $DF_2$, is an output pulse signal from first comparator 51 shown in FIG. 3. The outputs M and N of D-type flip-flops $DF_1$, $DF_2$ pass NAND gates $NA_1$, $NA_2$ and are input to switching device driving circuit 551. In accordance with these signals, frequency divider 55 generates a control signal.

For the circuit of FIG. 5, charts of wave forms at each node are illustrated in FIGS. 6A to 6G.

The K signal wave form shown in FIG. 6A is an output signal of first comparator 51. The K signal wave form is inverted in inverter INV and applied to clock terminal CK of first D-type flip-flop $DF_1$. Additionally, the K signal wave form is directly applied to clock terminal CK of second D-type flip-flop $DF_2$. NAND gates $NA_1$, $NA_2$, output M and N signals, respectively, as shown in FIGS. 6F and 6G.

The N and N signals are input to switching device driving circuit 551 shown in FIG. 7.

Figure 8A:
FIGS. 8A to 8H are wave form charts of each part of FIG. 7.
Figure 8B:
Figure 8C:
Figure 8D:
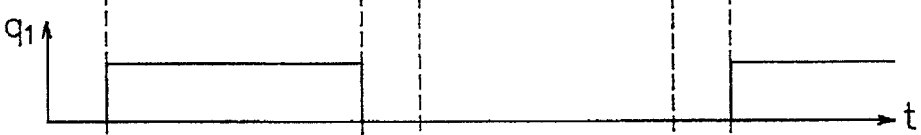
Figure 8E:
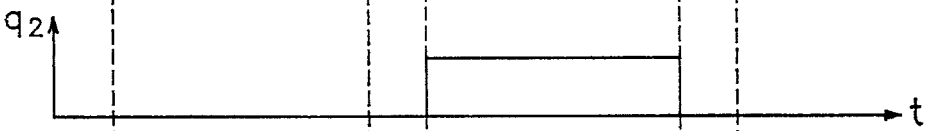
Figure 8F:
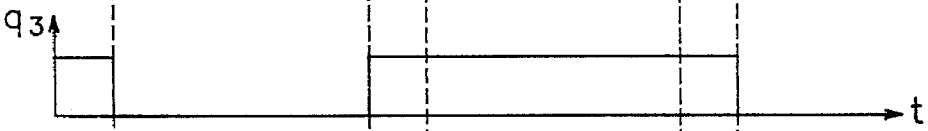
Figure 8G:
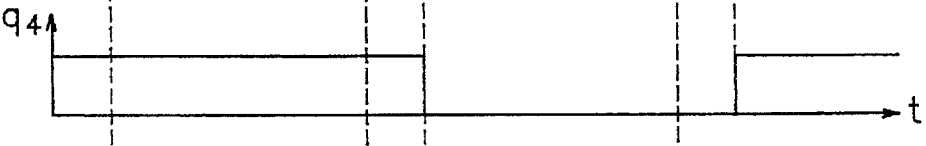
Figure 8H:
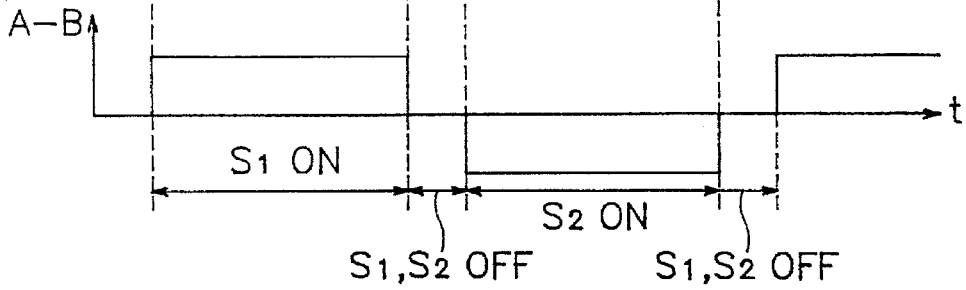

Wave form charts for each portion of switching device driving circuit 551 are illustrated in FIGS. 8A to 8H. The M and N signals input from NAND gates $NA_1$, $NA_2$ are shown in FIGS. 8B and 8C and are compared with the K signal shown in FIG. 8A. An output signal of switching device driving circuit 551 is taken from nodes A and B, and the wave form of the output signal is shown in FIG. 8H. The output signal of switching device driving circuit 551 is coupled by a transformer $T_{551}$ to gate terminals of metal oxide semiconductor field effect transistor switching devices $S_1$, $S_2$ of high frequency switching portion 6.

Switching-on time charts of four switching devices $q_1$ to $q_4$ of switching device driving circuit 551 are shown in FIGS. 8D to 8G, and operate to obtain the output signal shown in FIG. 8H.

Another input of frequency divider 55 is obtained from an output of second comparator 52, which comes from resonant circuit 7. The basic reason why the second comparator 52 is installed is to protect main power switching devices $S_1$, $S_2$ and the circuit against over-current. As will be recognized by those skilled in the art, a window comparator has been provided by second comparator 52 for protecting from and sensing over current.

The direct current voltage rectified by diodes $D_7$, $D_8$ is voltage divided by resistances $R_{18}$, $R_{20}$ of voltage divider 9, and the voltage drop across resistance $R_{20}$ is applied to the negative (−) input voltage of second comparator 52.

High frequency switching portion 6 receiving the switching control signal from controller 5 includes a MOSFET circuit, switching devices $S_1$, $S_2$, capacitors $C_{11}$, $C_{22}$, connected to the MOSFET circuit in parallel, and diodes $D_3$, $D_4$.

Figure 9A:
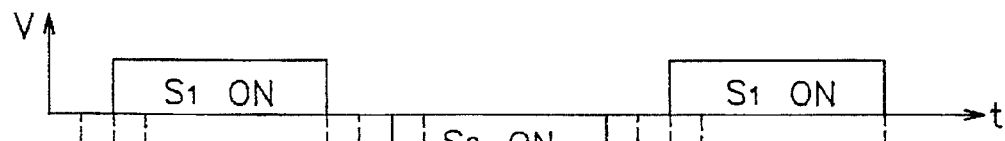
FIGS. 9A to 9G are wave form charts of each part of FIG. 3.

FIG. 9A is an output wave form chart of the signal between nodes A and B of switching device driving circuit 551 of frequency divider 55. The wave form resulting from when the switching devices $S_1$, $S_2$ are turned on is illustrated in FIGS. 9B and 9C, respectively.

Figure 9B:
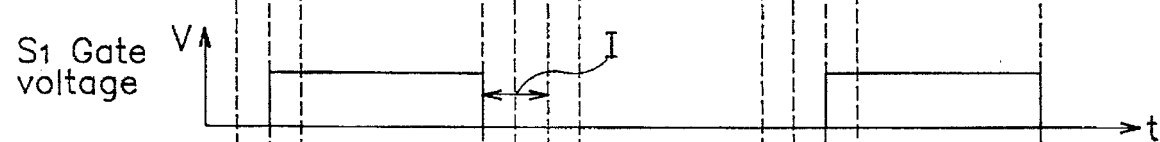
Figure 9C:
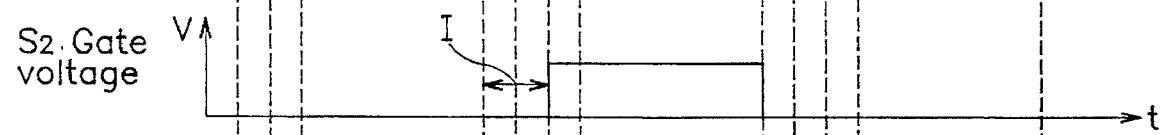

As the main feature of the operation of high frequency switching portion 6, main power switching devices $S_1$, $S_2$ are switched at the state when the voltage drop of switching devices $S_1$, $S_2$ is zero, i.e. the diodes $D_3$, $D_4$ are turned on, as shown in block I of FIG. 9B or 9C, which is called the "zero voltage switching" (ZVS) method, and is used for switching devices $S_1$, $S_2$ with high speed. According to the "ZVS" method, switching devices $S_1$, $S_2$ are switched with high speed so that there is little loss of switching Power.

In order to satisfy the operation of the ZVS method, frequency divider 55 includes D type flip-flops $DF_1$, $DF_2$. If the main power switching devices $S_1$, $S_2$ are switched alternatively, a dead time such as block I occurs (as shown in FIGS. 9B and 9C) in such a manner that switching devices $S_1$, $S_2$ may carry out the ZVS method. The first switching device $S_1$ is turned on in the positive (+) voltage pulse block of FIG. 9B, and the second switching device $S_2$ is turned on in the positive (+) voltage pulse block of FIG. 9C.

Figure 9D:
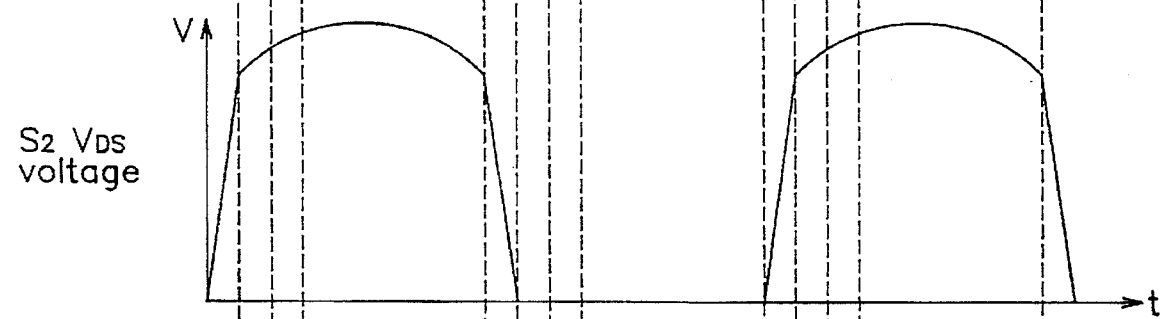
Figure 9E:
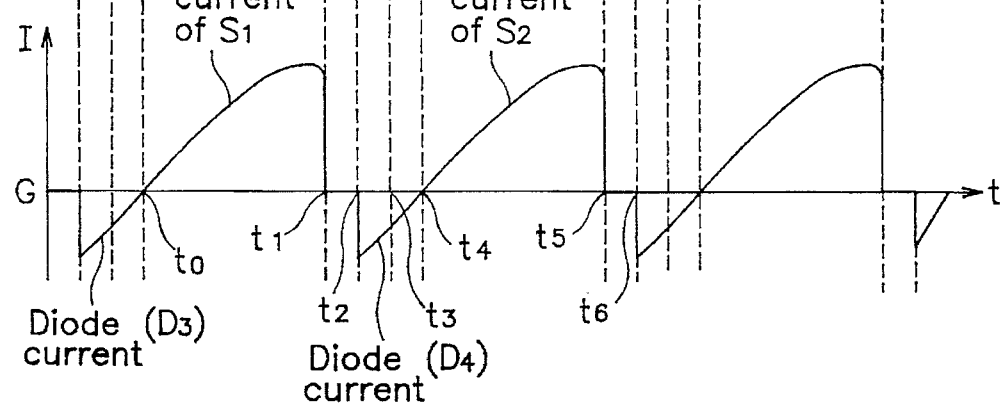

As the first switching device $S_1$ is turned on in the positive (+) voltage pulse block of FIG. 9B, voltage applied between drain and source of second switching device $S_2$ is as shown in FIG. 9D, and the current wave form is shown in FIG. 9E. The wave form ascending to the ground level G reference point is a current flowing via diode $D_3$, and the current rising from ground level G indicates a drain current of first switching device $S_1$. A detailed description of this will be given with reference to FIGS. 10A to 10C.

The operation of the "$t_o$-$t_1$" block of FIG. 9E will be described first.

Figure 10A:
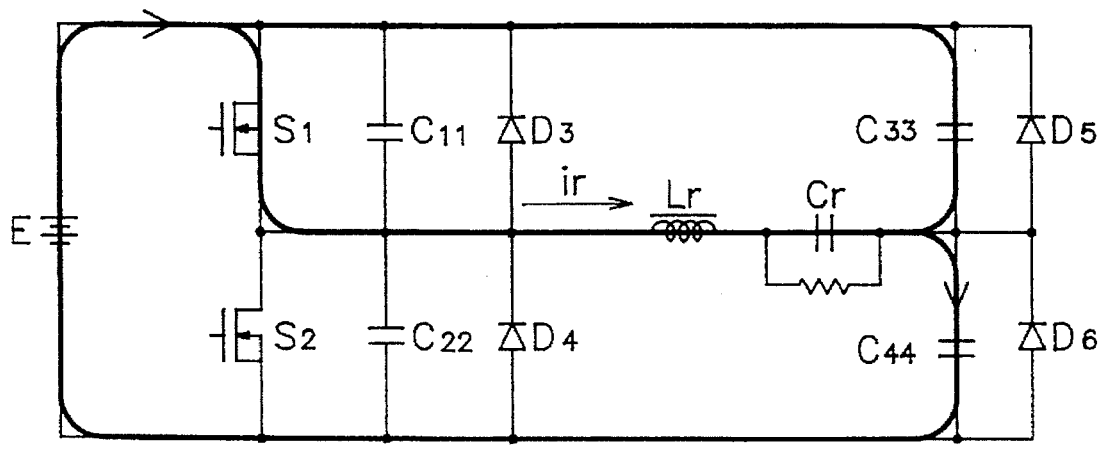
FIGS. 10A to 10C are circuit diagrams of the operation of FIG. 3.
Figure 10B:
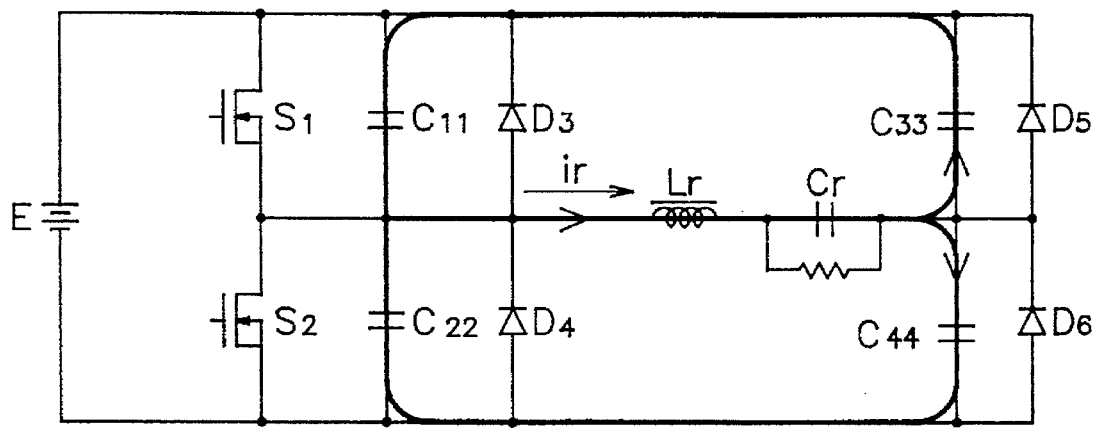

At the start point $t_o$, current $i_r$ in the circuit of FIG. 10A flows along the direction of the arrow, and finally flows via the course of E–$S_1$–$L_r$–$C_r$–$C_{44}$–E. At this time, capacitor $C_{44}$ begins to be charged, and capacitor $C_{33}$ begins to be discharged. Such an operation mode is finished by turning off switching device $S_1$ at point $t_1$.

Now, the operation of the "$t_1$-$t_2$" block of FIG. 9E will be described.

If switching device $S_1$ is turned off at point $t_1$, current $i_r$ changes its course from switching device $S_1$ to capacitor $C_{11}$, and flows via the course of E–$C_{11}$–$L_r$–$C_r$–$C_{44}$–E. At this point, capacitor $C_{11}$ begins to be charged, and capacitor $C_{22}$ begins to be discharged. This operation mode is finished when the voltage of capacitor $C_{22}$ is zero at point $t_2$.

Now the operation of the "$t_2$-$t_4$" block of FIG. 9E will be described.

Figure 10C:
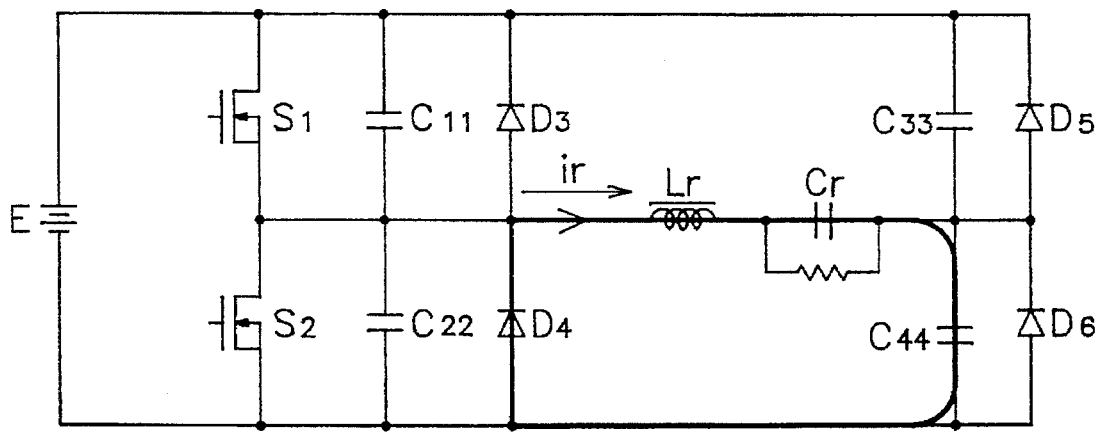
Figure 11:
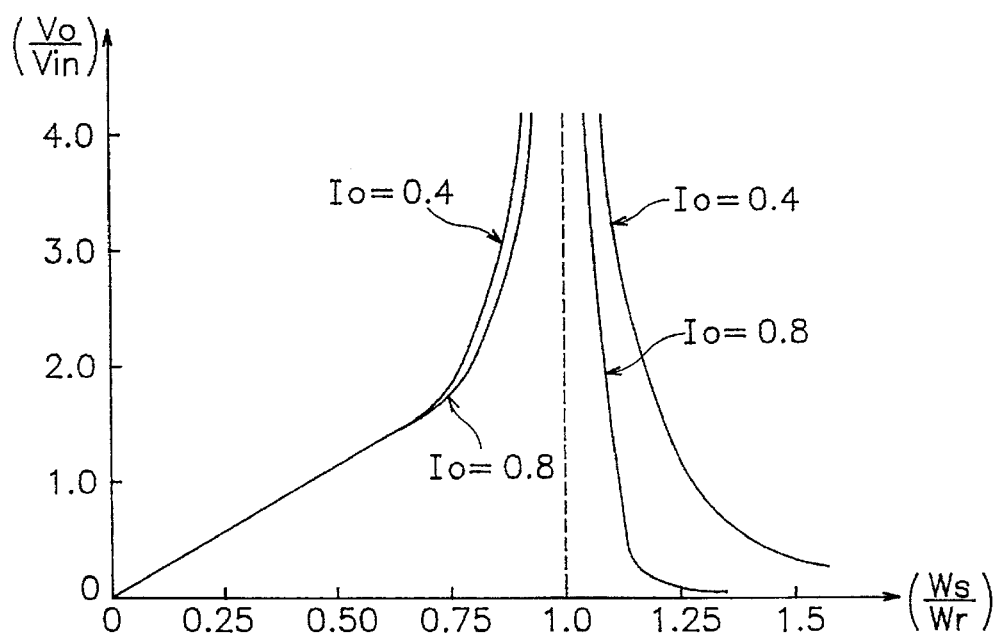
FIG. 11 is a graph showing the characteristics of a resonant circuit portion of FIG. 3.

If the voltage of capacitor $C_{22}$ is zero at point $t_2$, the course of current $i_r$ is changed to diode D4, as shown in FIG. 10C. That is, the current $i_r$ flows via the course of $L_r$–$C_r$–$C_{44}$–$D_4$–$L_r$.

Under this condition there is free-wheeling energy in resonant circuit 7, which does not depend on power source E. This condition continues to point $t_4$.

To meet the ZVS method requirements, switching device $S_2$ is turned on at point $t_3$. Since the current $i_r$ maintains a positive (+) direction at point $t_2$, current does not flow via switching device $S_2$. And since switching device $S_2$ just maintains a turn on state, switching device $S_2$ meets the ZVS method requirement.

The above description relates to the switching period of switching device $S_1$. The switching period of device $S_2$ performs similarly during points $t_3$–$t_6$ so a detailed description of this operation has been omitted.

The operation of diodes $D_5$, $D_6$ in FIG. 3 is as follows.

Diodes $D_5$, $D_6$ are diodes for clamping the voltages of capacitors $C_{33}$, $C_{44}$ to power voltage E. If the system performs abnormally, the voltage of the capacitors $C_{33}$, $C_{44}$ could rise beyond power voltage E by resonance. To prevent this, the diodes $D_5$, $D_6$ are turned on to thereby clamp the capacitor voltages to power voltage E.

Figure 9F:
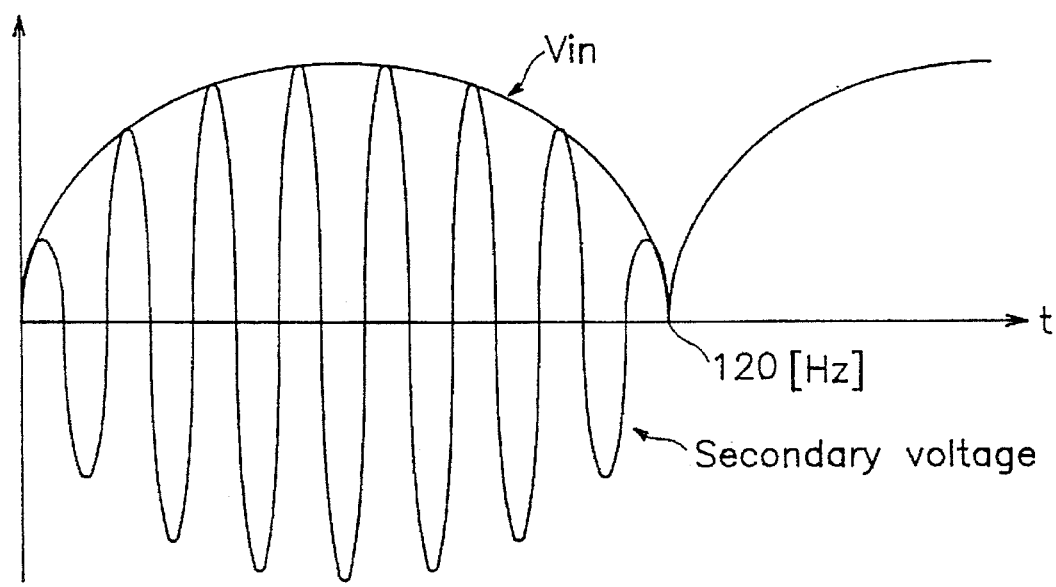
Figure 9G:
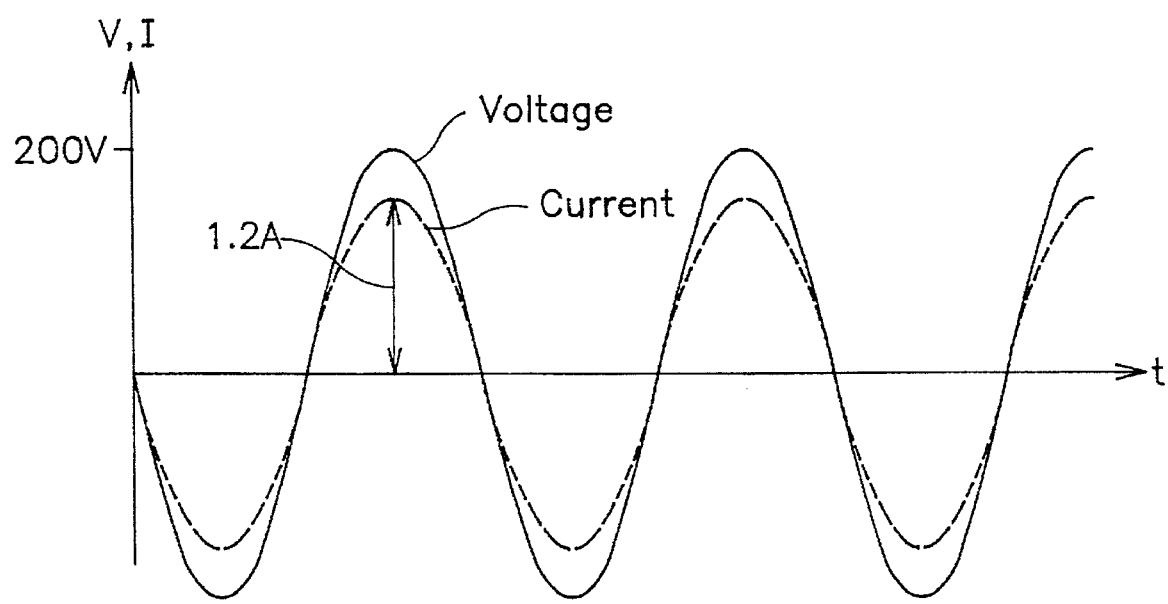

An output of high frequency switching portion 6 is applied to resonant circuit 7, and the output of resonant circuit 7 is applied to an output circuit portion 8 via the transformer $T_1$ to transmit power to load $R_o$. The wave form chart of FIG. 9F relates to a secondary voltage wave form of transformer $T_1$, and is compared with the alternating current input voltage $V_{in}$. FIG. 9G is a wave form chart of voltage V and current I of the alternating current input voltage $V_{in}$, and the voltage and current is in phase.

Figure 2A:
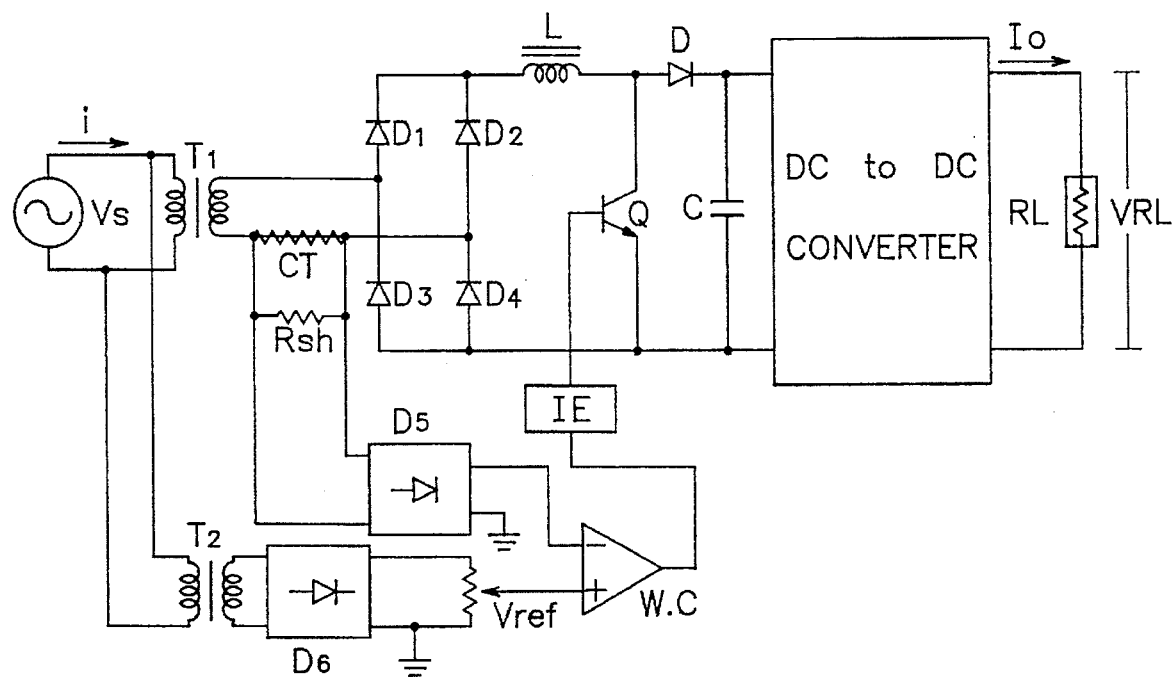
FIG. 2A is a circuit diagram of a conventional boosting type converter circuit.
Figure 2B:
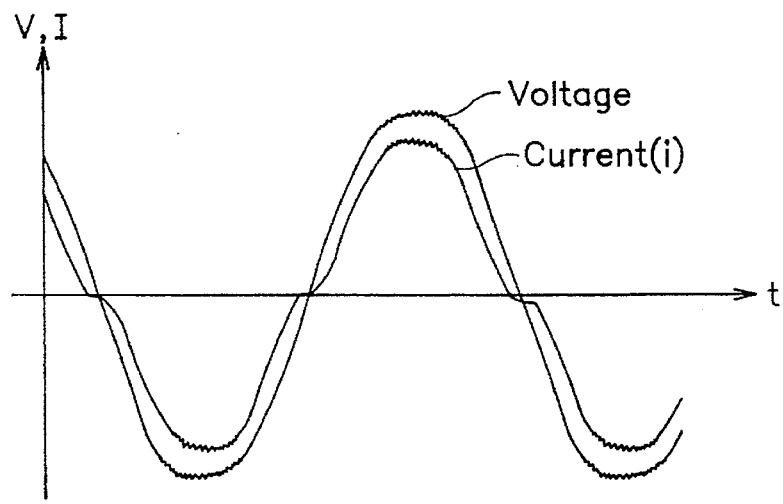
FIG. 2B is a wave form chart of input voltage and current applied to the circuit of FIG. 2A.

Since the present invention does not require switching devices Q and capacitors C that are present in the boosting converter technique, shown in FIGS. 2A and 2B, the present invention improves reliability and provides economical advantages.

Resonance circuit 7 is connected to the output of high frequency switching portion 6 and output circuit portion 8 is connected to resonant circuit 7 as shown in FIG. 3. The arrangement of the present invention provides control of the switching angle frequency $\omega_s$ of high frequency switching portion 6 to a higher range than the natural vibration frequency $\omega_r$ of resonant inductor $L_r$, and resonant capacitor $C_r$. The natural vibration frequency $\omega_r$ of the resonant circuit 7 is expressed by the following equation 4.

$$\omega_r = \frac{1}{\sqrt{Lr \cdot Cr}} \qquad (4)$$

A high frequency signal is transmitted to the output circuit portion 8 via transformer $T_1$ connected in parallel to capacitor $C_r$ of resonant circuit 7. Its voltage and current are in phase. This signal is converted into a direct current (DC) voltage by diode bridge circuits $D_{11}$, $D_{22}$, $D_{33}$, $D_{44}$ of output circuit portion 8, inductor Lo and capacitor Co, and is then supplied to load Ro.

Another object of the present invention is to provide stable power without fluctuation at the input power level or load. To achieve this object a feedback voltage signal is detected from output voltage detecting portion 10 connected in parallel to load Ro. The feedback voltage signal from output voltage detecting portion 10 is input to phase inverter 53 of controlling portion 5. Phase inverter 53 is an inversion amplifying circuit including an operational amplifier, and its variable signal is output to error amplifier 56 which also receives reference voltage $V_{ref}$.

Output circuit portion 8 has inductor Lo and capacitor Co forming an output filter, and its pole frequency is expressed by the following equation 5:

$$fo = \frac{1}{2\pi \sqrt{Lo \cdot Co}} \qquad (5)$$

Accordingly, error amplifier 56 is designed to have two zero points and one pole to compensate for the frequency characteristics of the output filter of output circuit portion 8.

$$f_{z1} = \frac{1}{2\pi R_{13} \cdot C_5} \text{ [Hz]} \tag{6}$$

$$f_{z2} = \frac{1}{2\pi R_{12} \cdot C_4} \text{ [Hz]} \tag{7}$$

$$f_{p1} = \frac{1}{2\pi R_{14} \cdot C_5} \text{ [Hz]} \tag{8}$$

The gain of error amplifier 56 is expressed by the following equation 9:

$$\text{Gain} = \frac{R_{12}}{R_{13}//R_{14}} \text{ [Hz]} \tag{9}$$

Error amplifier 56 controls the saw tooth wave output frequency of VCO 54, and adjusts the saw tooth wave output frequency if there is any fluctuation in the signal input to error amplifier 56. Accordingly, the output frequency of first comparator 51 is adjusted and the frequency of the switching output signal from frequency divider 55 is also adjusted. However, in the case of normal operation without fluctuation, logic circuit 55 outputs a constant frequency signal.

In short, if the voltage input to error amplifier 56 increases the alternating current level and output of error amplifier 56 increases. As a result, the saw tooth wave frequency and switching frequency increase, and input power then decreases.

On the other hand, if the voltage input to error amplifier 56 decreases, then input power increases. In this way, the output or load voltage is maintained constant even when the power source fluctuates.

Figure 12:
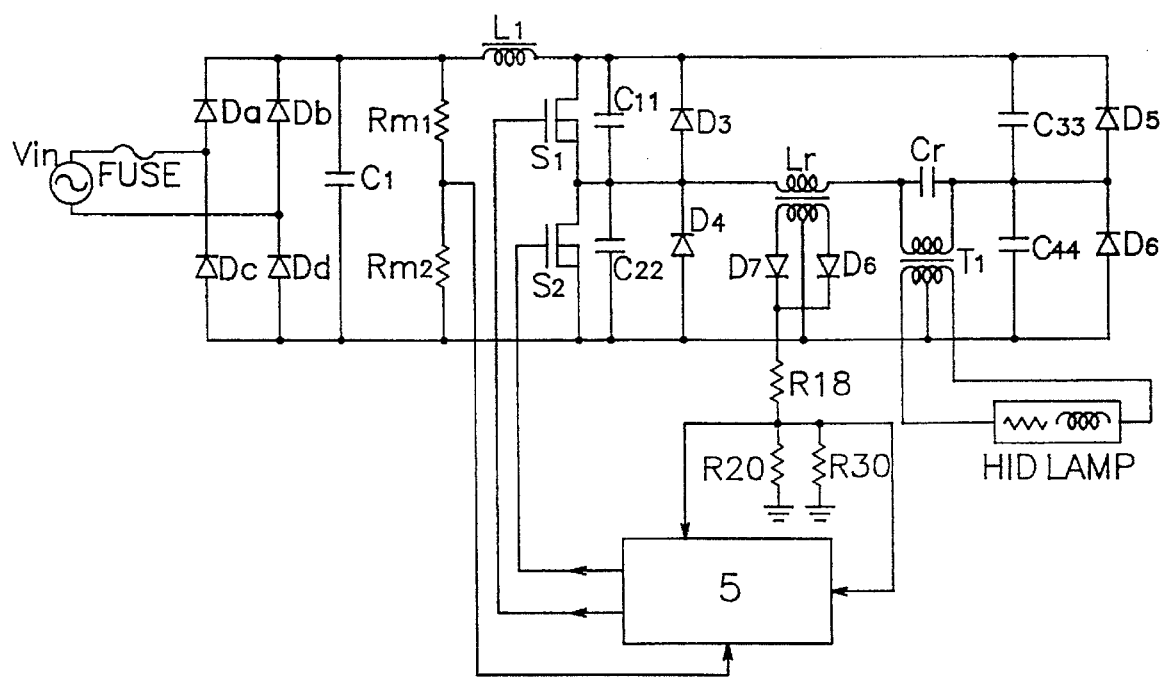
FIG. 12 and FIG. 13 are a preferred embodiment of the present invention.
Figure 13:
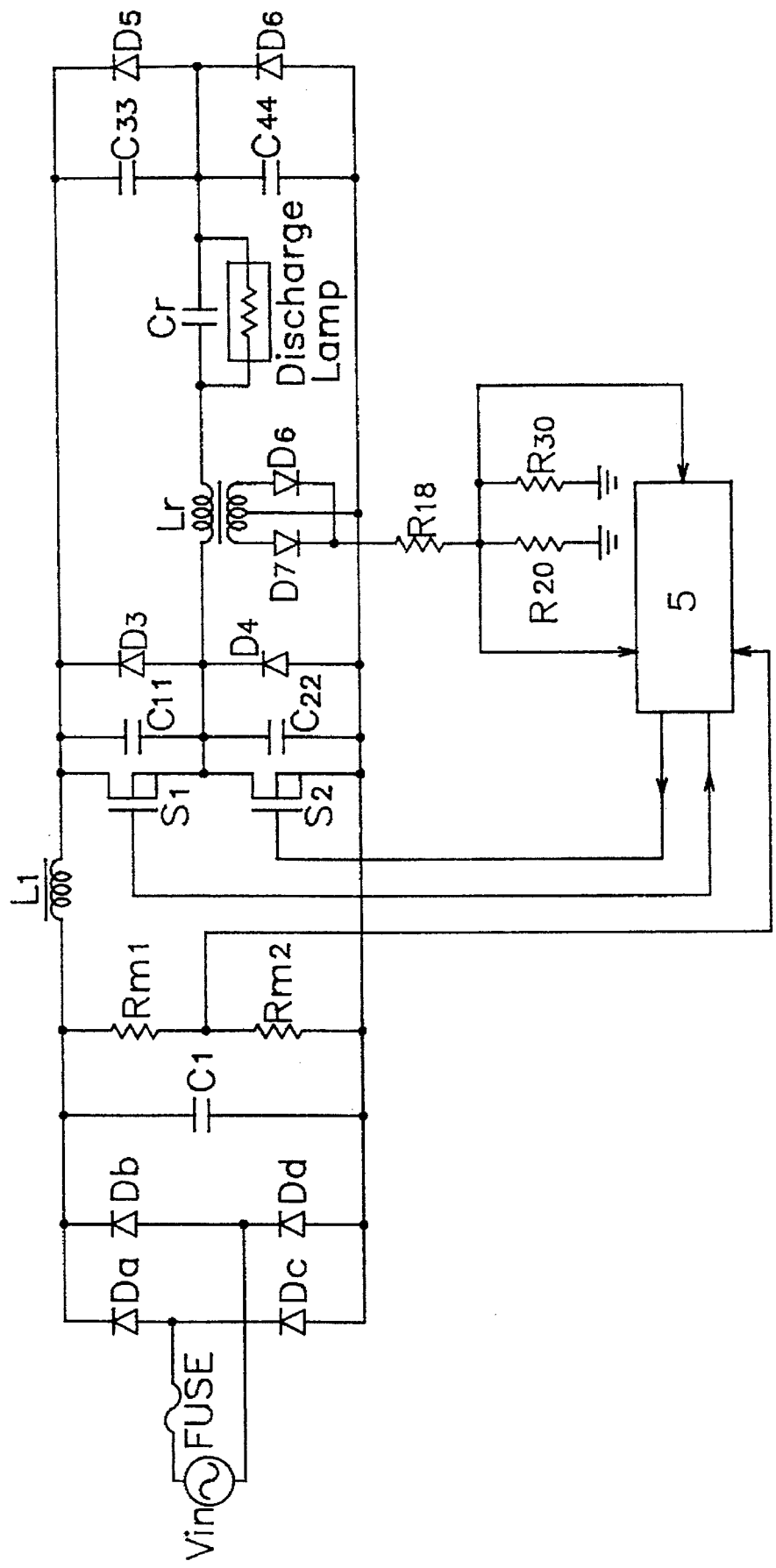

Preferred embodiments applying the features of the present invention are illustrated in FIGS. 12 and 13. These two embodiments are similar to the circuit shown in FIG. 3. In the FIG. 12 embodiment, an output circuit comprising a high intensity discharge lamp (HID) is provided. In the FIG. 13 embodiment, a discharge lamp is connected in parallel to a capacitor $C_r$ of a resonant circuit as the load and a signal is fed back to control circuit 5 depending on the voltage across resistance means $R_{30}$ which is connected to a secondary voltage of inductor $L_r$ of the resonant circuit.

These preferred embodiments of this invention are applied to an electronic stabilizer as a high power factor, high efficiency, and high level density power supply system.

The invention provides simpler circuits and improves power factor as compared to the prior art boosting type converting technique. Power factor is improved by removing dead angle of current and dead time of current, which advantageously improves reliability and economy. The present invention provides a system which is small in size and light in weight.

Figure 1A:
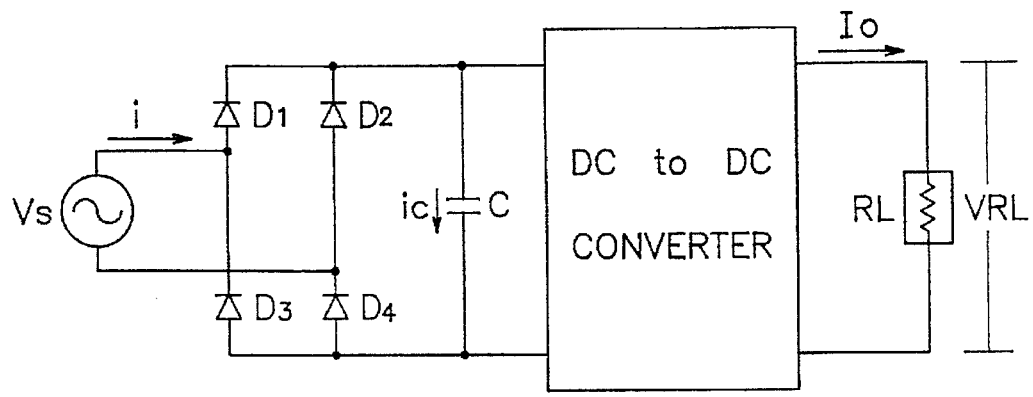
FIG. 1A is a conventional condenser input type rectifier circuit.
Figure 1B:
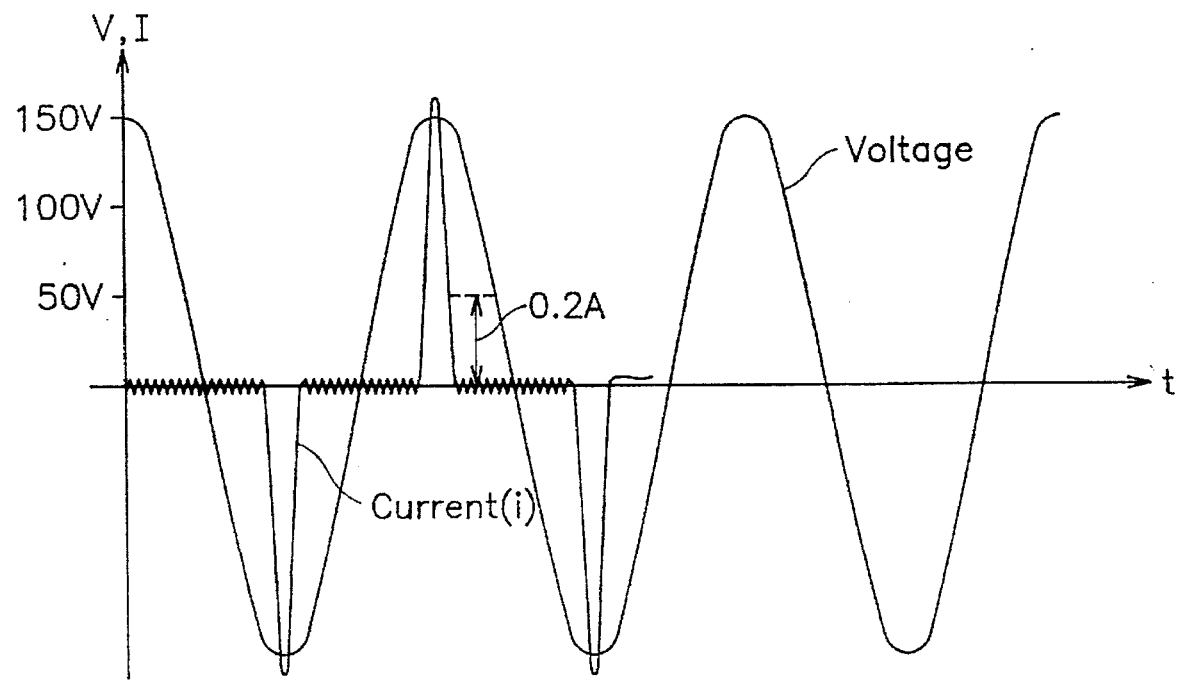
FIG. 1B is a wave form chart of input voltage and input current applied to the circuit of FIG. 1A.

The present invention is capable of obtaining the wave form shown in FIG. 9G. This wave form does not have any distortion as compared with FIGS. 1B and 2B.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A high power factor power supply system comprising:
   a full wave rectifying means for rectifying an alternating current signal;
   a voltage dividing means for receiving the rectified signal from said full wave rectifying means and dividing the rectified signal;
   an inductor connected to said full wave rectifying means;
   switching means controlled by a switching controlling signal for controlling current flowing in said inductor;
   a resonant circuit portion formed of a resonant circuit inductor and a resonant circuit capacitor and connected to said switching means;
   an output circuit for receiving a signal from said resonant circuit portion, rectifying and then transmitting said signal to a load; and
   a controlling circuit means for providing said switching controlling signal to said switching means, said controlling circuit means including:
   a saw tooth wave signal generator which produces a saw tooth wave signal,
   comparing means for comparing an output of said voltage dividing means with said saw tooth wave signal to obtain a series of switching pulses, and
   a frequency divider for generating a switching controlling signal having a zero area to turn off said switching means during each of said switching pulses.

2. A high power factor power supply system according to claim 1, wherein said frequency divider includes:
   first and second D type flip-flops each using said series of switching pulses as a clock signal;
   first and second logic gates coupled to outputs of said first and second D type flip flops for generating two separate series of pulse signals; and
   a switching driving circuit for generating two separate series of driving pulses as said switching controlling signal from said two separate series of pulse signals.

3. A high power factor power supply system according to claim 1, further comprising a second comparing means for comparing an output of said resonant circuit with a reference signal to obtain a second comparator output that is supplied to the frequency divider to block said switching controlling signal when over-current occurs.

4. A high power factor power supply system comprising:
   a full wave rectifying means for rectifying an alternating signal;
   a voltage dividing means for receiving the rectified signal from said full wave rectifying means and dividing the rectified signal;
   an inductor connected to said full wave rectifying means;
   switching means controlled by a switching controlling signal for controlling current flowing in said inductor;
   a resonant circuit portion formed of a resonant circuit inductor and a resonant circuit capacitor and connected to said switching means;
   an output circuit for receiving a resonant signal from said resonant circuit portion, rectifying said resonant signal and then transmitting said rectified resonant signal to a load;
   a controlling circuit for providing a switching controlling signal to said switching means, said controlling circuit means including:
   a saw tooth wave signal generator which produces a saw tooth wave signal,
   a frequency divider for providing said switching controlling signal to said switching means based upon said saw tooth wave signal,
   a comparing means for feeding back a feedback signal based upon said rectified resonant signal supplied to said load and then comparing the feedback signal with a reference signal; and an error amplifying means receiving an output of said comparing means to change a frequency of said saw tooth wave signal according to a signal level of said error amplifying means.

5. A high power factor power supply system according to claim 4, wherein said frequency divider includes:

first and second D type flip-flops each using a series of switching pulses derived from said sawtooth wave signal as a clock signal;

first and second logic gates coupled to outputs of said first and second D type flip flops for generating two separate series of pulse signals; and a switching driving circuit for generating two separate series of driving pulses from said two separate series of pulse signals.

6. A high power factor power supply system according to claim 4, further comprising a second comparing means for comparing an output of said resonant circuit with a reference signal to obtain a second comparator output that is supplied to the frequency divider to block said switching controlling signal when over-current occurs.

7. A high power factor power supply system comprising:

a full wave rectifying means for rectifying an alternating signal;

a voltage dividing means for dividing a rectified signal;

a capacitor connected in parallel to said voltage dividing means;

an inductor connected to said full wave rectifying means;

switching means controlled by a switching controlling signal for controlling a supply of current flowing in said inductor;

a resonant circuit portion formed of a resonant circuit inductor and capacitor and connected to said switching means;

a transformer for receiving a resonant signal from said resonant circuit portion, rectifying said resonant signal and then transmitting said rectified resonant signal to a load;

a controlling circuit for providing a switching controlling signal to said switching means, said controlling circuit means including:

a saw tooth wave signal generator which produces a saw tooth wave signal, a frequency divider for providing said switching controlling signal to said switching means based upon said saw tooth wave signal, a comparing means for feeding back a feedback signal based upon said rectified resonant signal supplied to said load and then comparing the feedback signal with a reference signal; and an error amplifying means receiving an output of said comparing means to change a frequency of said saw tooth wave signal according to a signal level of said error amplifying means.

8. A high power factor power supply system according to claim 7, further comprising a second comparing means for comparing an output of said resonant circuit with a reference signal to obtain a second comparator output that is supplied to the frequency divider to block said switching controlling signal when over-current occurs.

9. A high power factor power supply system according to claim 7, wherein said frequency divider includes:

first and second D type flip-flops each using a series of switching pulses derived from said sawtooth wave signal as a clock signal;

first and second logic gates coupled to outputs of said first and second D type flip flops for generating two separate series of pulse signals; and a switching driving circuit for generating two separate series of driving pulses from said two separate series of pulse signals.

10. A high power factor power supply system according to claim 7, wherein said load is a high intensity discharge lamp.

11. A high power factor power supply system according to claim 1, wherein said switching controlling signal has a zero voltage during each of said switching pulse voltages.

12. A high power factor power supply system according to claim 2, wherein said first and second logic gates are NAND gates.

13. A high power factor power supply system according to claim 4 wherein said controlling circuit further includes comparing means for comparing an output of said voltage dividing means with said saw tooth wave signal to obtain a series of switching pulses, and wherein said frequency divider generates said switching controlling signal to turn off said switching means during each of said switching pulses.

14. A high power factor power supply system according to claim 2 wherein each of said two separate series of driving pulses are intermittently generated.

15. A high power factor power supply system according to claim 5, wherein said first and second logic gates are NAND gates.

16. A high power factor power supply system according to claim 6 wherein said controlling circuit further includes comparing means for comparing an output of said voltage dividing means with said saw tooth wave signal to obtain a series of switching pulses, and wherein said frequency divider generates said switching controlling signal to turn off said switching means during each of said switching pulses.

17. A high power factor power supply system according to claim 5 wherein each of said two separate series of driving pulses are intermittently generated.

18. A high power factor power supply system according to claim 9, wherein said first and second logic gates are NAND gates.

19. A high power factor power supply system according to claim 7 wherein said controlling circuit further includes comparing means for comparing an output of said voltage dividing means with said saw tooth wave signal to obtain a series of switching pulses, and wherein said frequency divider generates said switching controlling signal to turn off said switching means during each of said switching pulses.

20. A high power factor power supply system according to claim 9 wherein each of said two separate series of driving pulses are intermittently generated.

21. A high power factor power supply system according to claim 1 further including a capacitor connected in parallel to said voltage dividing means.

22. A high power factor power supply system according to claim 4 further including a capacitor connected in parallel to said voltage dividing means.

* * * * *